United States Patent
Olson

(10) Patent No.: US 9,233,459 B2
(45) Date of Patent: Jan. 12, 2016

(54) CHANNEL NUT TOOL

(71) Applicant: Marvin Olson, North Aurora, IL (US)

(72) Inventor: Marvin Olson, North Aurora, IL (US)

(73) Assignee: Fermi Research Alliance, LLC, Batavia, IL (US)

(*) Notice: Subject to any disclaimer, the term of this patent is extended or adjusted under 35 U.S.C. 154(b) by 275 days.

(21) Appl. No.: 13/746,563

(22) Filed: Jan. 22, 2013

(65) Prior Publication Data

US 2014/0201967 A1 Jul. 24, 2014

(51) Int. Cl.
*B25B 31/00* (2006.01)
*F16B 37/04* (2006.01)
*E04C 3/04* (2006.01)

(52) U.S. Cl.
CPC .............. *B25B 31/00* (2013.01); *F16B 37/045* (2013.01); *E04C 2003/0473* (2013.01); *Y10T 29/49826* (2015.01); *Y10T 29/53909* (2015.01)

(58) Field of Classification Search
CPC ...... B25B 13/06; B25B 13/065; B25B 31/00; Y10T 29/53843; Y10T 29/53848
USPC ........ 29/255, 256; 81/121.1, 177.2, 436–461, 81/52; 411/389
See application file for complete search history.

(56) References Cited

U.S. PATENT DOCUMENTS

| | | | | |
|---|---|---|---|---|
| 1,566,691 A * | 12/1925 | Perry | ............... | 81/53.2 |
| 2,336,157 A * | 12/1943 | Bayes | ............... | 81/53.2 |
| 2,521,910 A * | 9/1950 | Goldberg | ............... | 408/215 |
| 2,562,307 A * | 7/1951 | Flugrath | ............... | 81/121.1 |
| 2,775,153 A * | 12/1956 | Parhaniemi | ............... | 81/53.2 |
| 2,800,820 A * | 7/1957 | Retterath | ............... | 81/53.2 |
| 3,368,430 A * | 2/1968 | Levering | ............... | 81/53.2 |
| 4,106,178 A * | 8/1978 | Seletyn | ............... | 29/428 |
| 4,684,138 A * | 8/1987 | Michaud | ............... | 279/7 |
| 4,741,229 A * | 5/1988 | Rachanski et al. | ............... | 81/53.2 |
| 4,815,779 A | 3/1989 | Glessner et al. | | |
| 4,982,625 A * | 1/1991 | Bonner | ............... | 81/53.2 |
| 5,058,264 A | 10/1991 | Quach | | |
| 5,901,622 A * | 5/1999 | Sweeny | ............... | 81/439 |
| 6,050,157 A * | 4/2000 | Ludwig et al. | ............... | 81/121.1 |
| 6,347,450 B1 * | 2/2002 | Langlois et al. | ............... | 29/748 |
| 6,536,088 B1 | 3/2003 | Chiang | | |
| 6,931,966 B2 * | 8/2005 | Monroig et al. | ............... | 81/121.1 |
| 7,017,678 B1 * | 3/2006 | Alqadhi | ............... | 173/1 |
| 7,677,140 B2 * | 3/2010 | Hull et al. | ............... | 81/177.2 |
| 7,862,593 B2 * | 1/2011 | Clement et al. | ............... | 606/260 |
| 8,136,430 B2 * | 3/2012 | Hu | ............... | 81/177.2 |
| 8,308,772 B2 * | 11/2012 | Clement et al. | ............... | 606/267 |
| 8,534,165 B2 * | 9/2013 | Wente et al. | ............... | 81/177.2 |
| 2005/0000327 A1 * | 1/2005 | Monroig et al. | ............... | 81/121.1 |
| 2007/0157446 A1 | 7/2007 | Kothke | | |

OTHER PUBLICATIONS

SS-12 Strut Systems Catalog, Cooper B-Line, Inc., Highland, Illinois (2012) 252 pages.

* cited by examiner

*Primary Examiner* — Lee D Wilson
*Assistant Examiner* — Jamal Daniel
(74) *Attorney, Agent, or Firm* — Kevin Soules; Luis M Ortiz; Kermit D Lopez

(57) ABSTRACT

A method, system, and apparatus for installing channel nuts includes a shank, a handle formed on a first end of a shank, and an end piece with a threaded shaft configured to receive a channel nut formed on the second end of the shaft. The tool can be used to insert or remove a channel nut in a channel framing system and then removed from the channel nut.

3 Claims, 7 Drawing Sheets

CHANNEL NUT TOOL

STATEMENT OF GOVERNMENT RIGHTS

The invention disclosed in this application was made with Government support under the Fermi Research Alliance, LLC, contract Number DE-AC02-07CH11359 awarded by the U.S. Department of Energy. The Government has certain rights in the invention.

FIELD OF INVENTION

Embodiments are generally related to the field of tools and hand tools. Embodiments are also related to methods and systems for inserting and removing nuts. Embodiments are additionally related to tools for inserting and removing channel nuts in channels.

BACKGROUND

The task of assembling channel framing systems requires that a channel nut be inserted into a channel by hand. This is a difficult process which requires workers to use their fingers to insert the channel nut into the channel and then put the channel nut in place.

Alternatively, prior art approaches to inserting channel nuts have made use of a magnetic connection between the channel nut and tool. However, these methods depend on the magnetic connection and fail when the nut is made of stainless steal, fiberglass, or other non-magnetic material. These methods and systems are further limited because they only work with spring nuts, which have a spring in the back. The disclosed methods and systems are designed to overcome the disadvantages associated with such tools.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a channel nut tool.

It is another aspect of the disclosed embodiments to provide for an enhanced method and system for inserting and removing channel nuts.

It is yet another aspect of the disclosed embodiments to provide an enhanced method, system, and apparatus for inserting and removing channel nuts in a channel framing system.

The aforementioned aspects and other objectives and advantages can now be achieved as described herein. A channel nut tool comprises a shank, a handle formed on a first end of the shank, and an end piece comprising a threaded shaft configured to receive a nut formed on a second end of the shank.

Additional forms in which embodiments of the invention can be manifest are described in the flowing description and claims.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description and claims, serve to explain the embodiments disclosed herein.

DETAILED DESCRIPTION

Figure 2A:
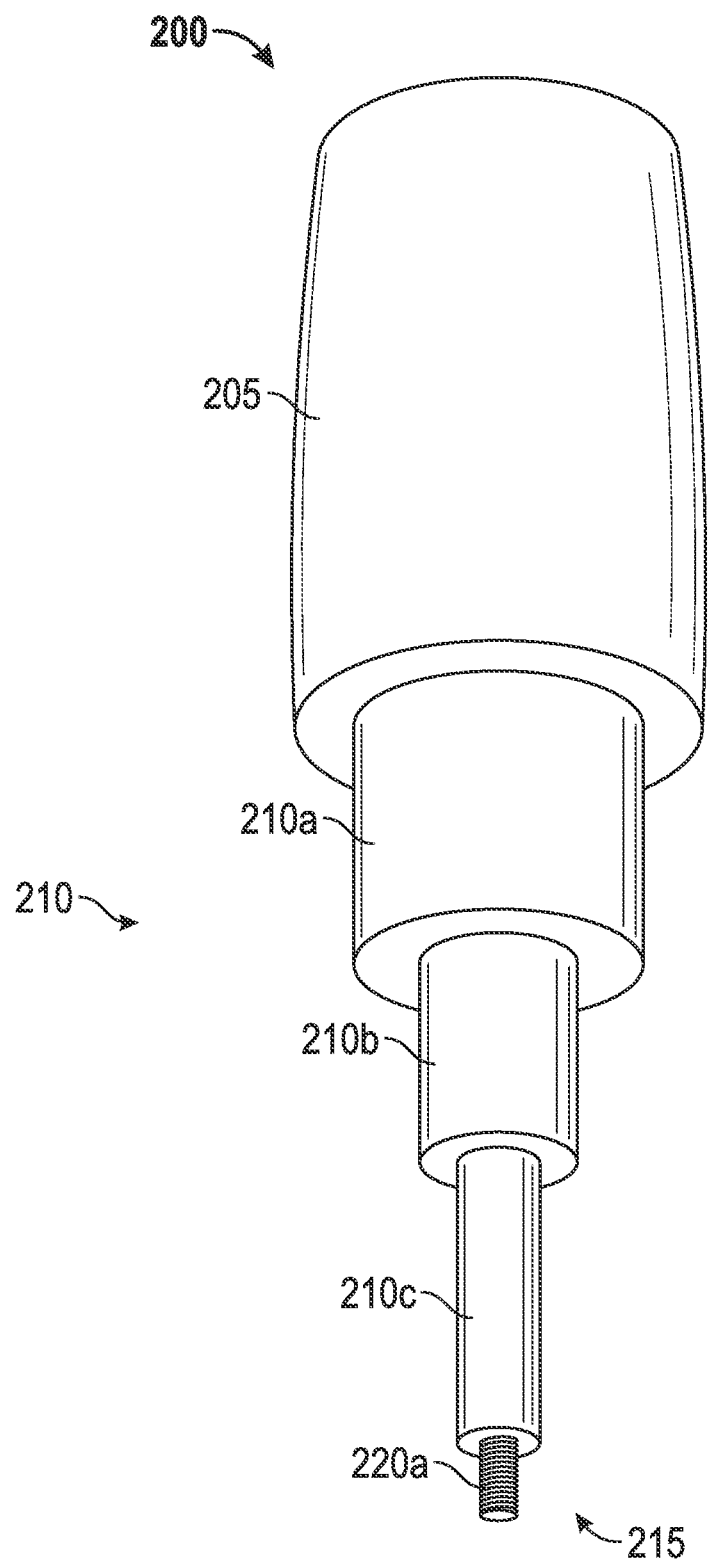
FIG. 2a depicts a side view of a channel nut tool.

Example embodiments, as disclosed herein, can improve the experience of inserting a channel nut in a channel framing system. As shown in FIG. 2a, for example, a channel nut tool 200 can include a handle 205, a shank 210, and an end piece 215.

In one embodiment, the handle 205 can be formed of molded plastic, metal, or other suitable material. The shank 210 can be formed of metal and comprises a single member. In an another embodiment, the shank 210 can comprise a series of telescoping members 210a, 210b, and 210c, which can be extended or retracted as necessary to allow the tool to reach the channel framing system. This is particularly useful for a tool used to insert nuts in a channel framing system because the framing system can often be installed in awkward areas that are difficult to reach. This is particularly true when the framing system is installed on a ceiling or other high location.

End piece 215 is comprised of a threaded shaft 220a. Threaded shaft 220a is comprised of between several turns of thread. In another embodiment, threaded shaft 220a can include between one-half and two turns of thread. A channel nut can be secured to the threaded shaft by twisting the channel nut onto the threaded shaft. However, the channel nut should not be screwed deeply onto the threaded shaft because the installation of the channel nut in the channel takes advantage of the relative ease of unscrewing the channel nut from the threaded shaft once the channel nut is in place in the channel framing system. Therefore, only a small number of turns are made available on the threaded shaft (i.e., one to two turns) so that the channel nut is easy to remove from the tool 200.

Figure 1:
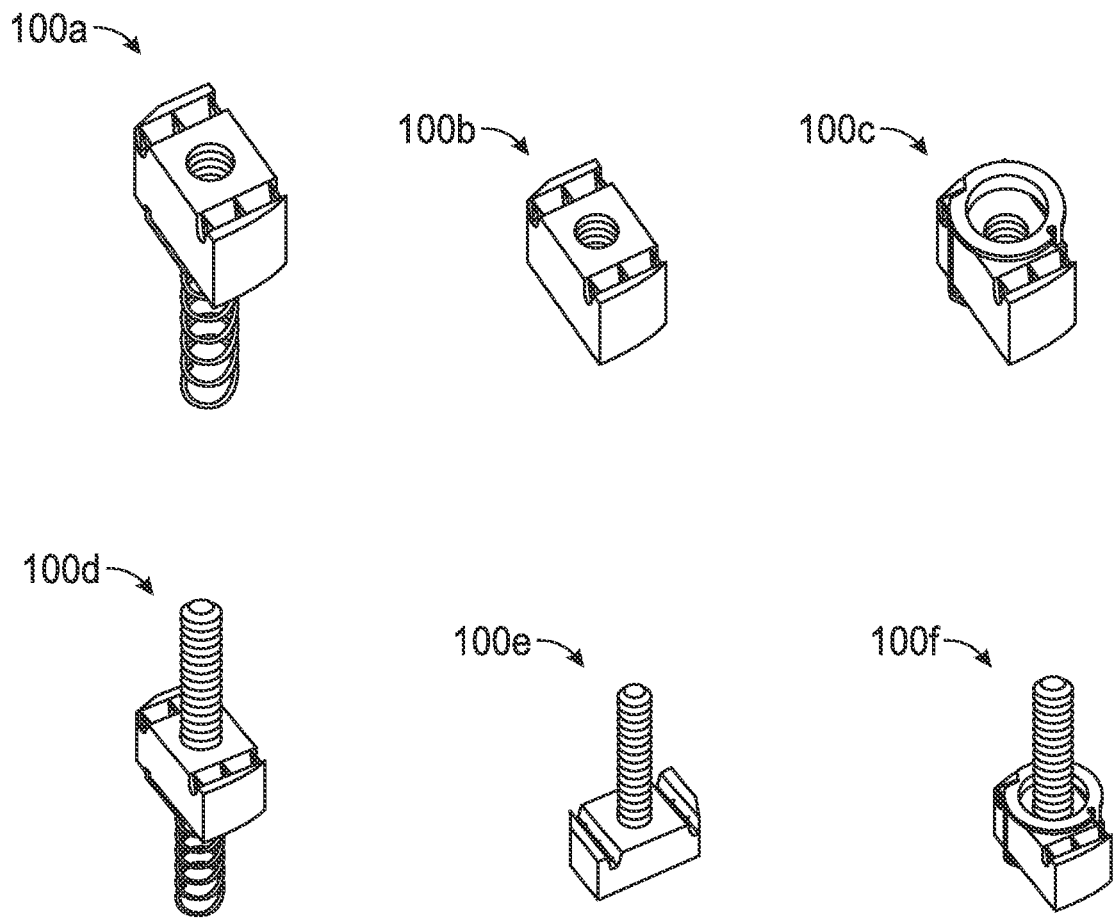
FIG. 1 illustrates a variety of channel nuts.
Figure 2B:
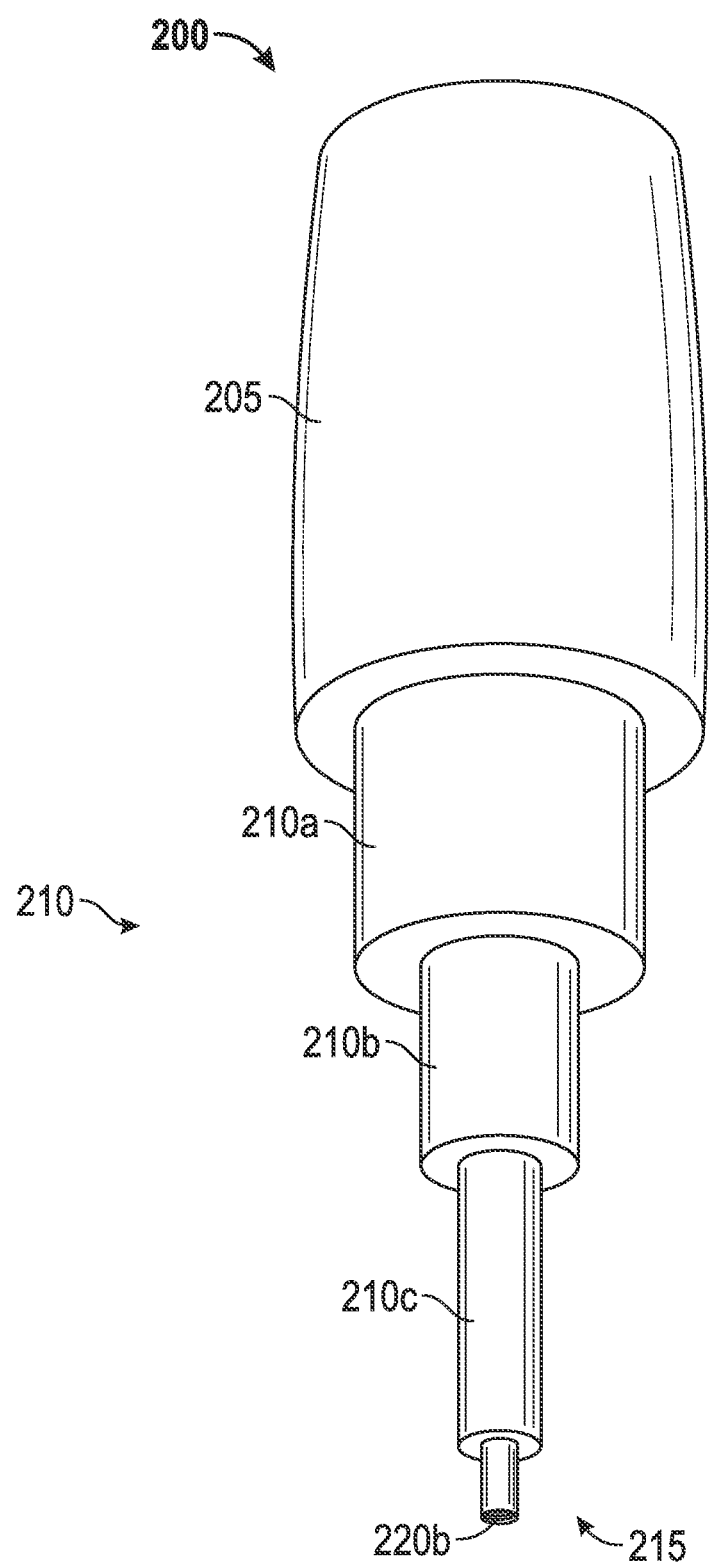
FIG. 2b depicts side view of a channel nut tool in accordance with an alternative embodiment.

In another embodiment illustrated in FIG. 2b, channel nut tool 200 includes a handle 205, shank 210, or alternatively, telescoping members 210a-c, and an end piece 215. However, in this embodiment end piece 215 comprises a threaded port 220b for receiving a threaded shaft of a channel stud nut as shown in FIG. 1.

In the embodiment illustrated in FIG. 2b, a channel stud nut can be secured to the channel nut tool 200 by twisting the channel stud nut into the threaded port 220b. The channel nut tool 200 can then be used in substantially the same way to insert or remove a channel stud nut into a channel framing system.

Figure 3:
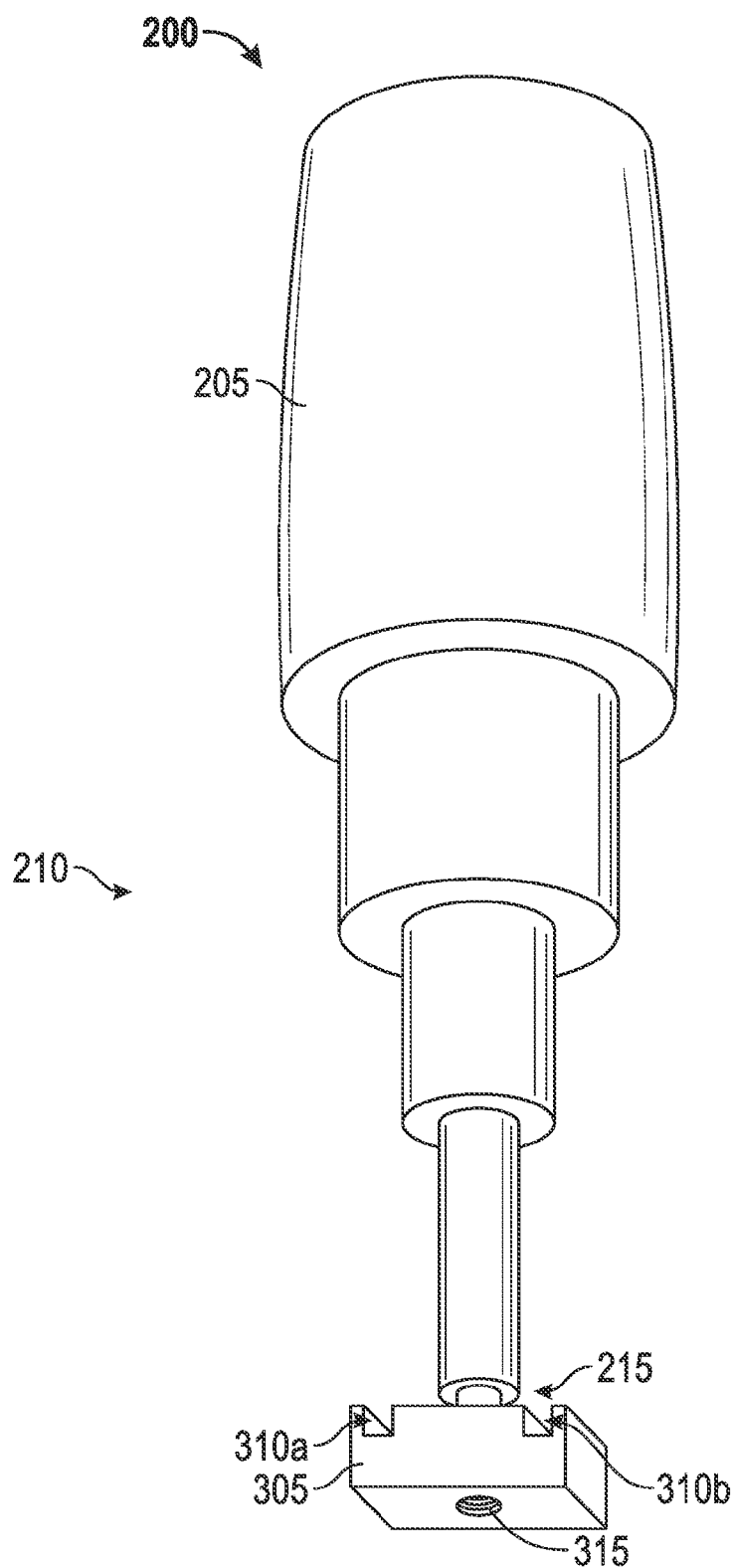
FIG. 3 depicts a side view of a channel nut tool and channel nut in accordance with another embodiment.

FIG. 3 illustrates a side view of a channel nut tool 100 in accordance with another embodiment of the invention. It should be noted that identical or similar features in the figures are labeled with corresponding reference numerals. FIG. 3 further illustrates channel nut tool 200 engaging a channel nut 305. It should be appreciated that channel nut 305 represents one of a multitude of channel nuts that can be installed using channel nut tool 200 and is provided merely as an example and is not intended to limit the scope of the disclosure.

For example, as illustrated in FIG. 1, channel nut 305 can be a channel spring nut 100a, a channel nut without spring 100b, a channel twirl nut 100c, a channel stud nut with spring 100d, a channel stud nut without spring 100e, or a channel twirl stud nut 100f. Any of these channel nuts can be made of metal, including stainless steel, fiberglass, or other suitable material including suitable non-magnetic materials.

Channel nut 305 includes channels 310a and 310b. These channels are configured to engage the rails of a channel framing system as described below. Channel nut 305 further includes a threaded port 315 for receiving a bolt, screw, or other threaded member. Threaded port 315 extends through channel nut 305 and is generally purposed for accepting connecting systems once the channel nut is installed in the channel framing system. However, for purposes of the disclosed embodiments, the threaded port is repurposed to accept the threaded shaft of channel nut tool 200.

It should be noted that both threaded port 315 and channel nut tool 200, and in particular threaded shaft 215, are sized with English or Metric sizes. In another embodiment, channel nut tool 200 is configured with the appropriate size to fit with the channel nut 305 which is desired to be installed or removed.

Figure 4:
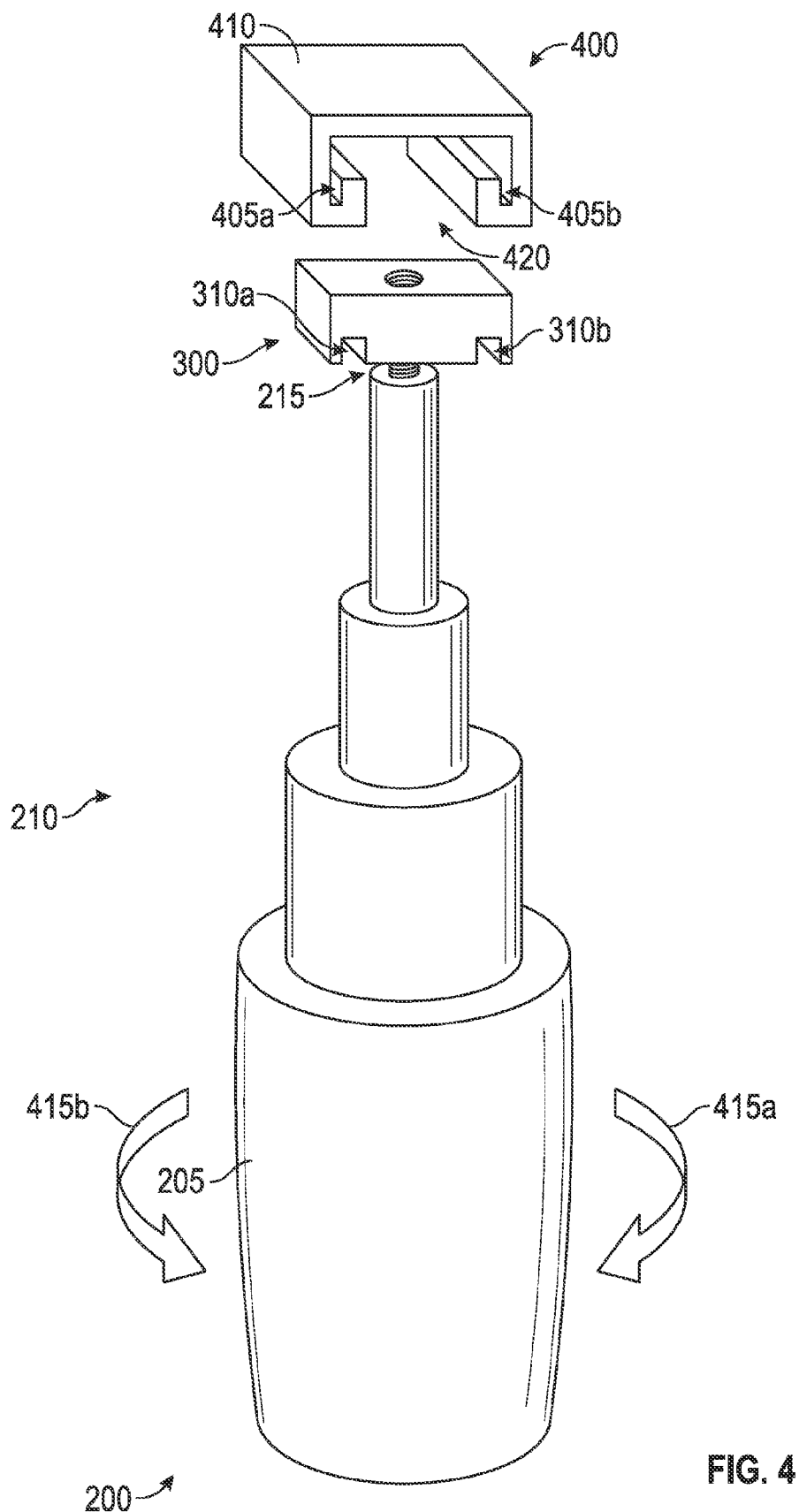
FIG. 4 depicts a side view of a channel nut tool inserting a channel nut in a channel in accordance with yet another embodiment.

FIG. 4 illustrates yet another example embodiment wherein a channel nut tool 200 is used to insert a channel nut 300 into a channel framing system 400. One skilled in the art will appreciate that channel nut tool 200 can be equivalently used to remove channel nuts from a channel framing system 400 as necessary.

Channel framing system 400 includes the channel body 410 and channel rails 405a and 405b. Channel nut 300 can be attached to a channel nut tool 200 by threading the channel nut 300 onto the threaded shaft 215 as shown.

Channel nut tool 200 can then be rotated as shown by arrows 415a and 415b as necessary so that the channel nut 300 is aligned to fit into the gap 420 formed between channel rails 405a and 405b of channel framing system 400. Once channel nut 300 is inside channel framing system 400, the channel nut tool 200 is again rotated along arrows 415a and 415b so that the channels 310a and 310b are aligned with channel rails 405a and 405b respectively.

Once the channels 310a and 310b are aligned with channel rails 405a and 405b, the channel nut tool is used to engage the channel rails 405 in the channels 310. The channel nut 300 is now in place, but the channel nut tool 200 still needs to be removed from the channel nut 300. This is achieved by applying a small force so that the channel nut's channels 310 are held tightly against the channel rails 405. Channel nut tool 200 is then once again rotated according to arrows 415. As the channel nut tool 200 is rotated, threaded shaft 215 disengages from the channel nut 300 leaving the channel nut 300 installed in the channel framing system 400.

Figure 5:
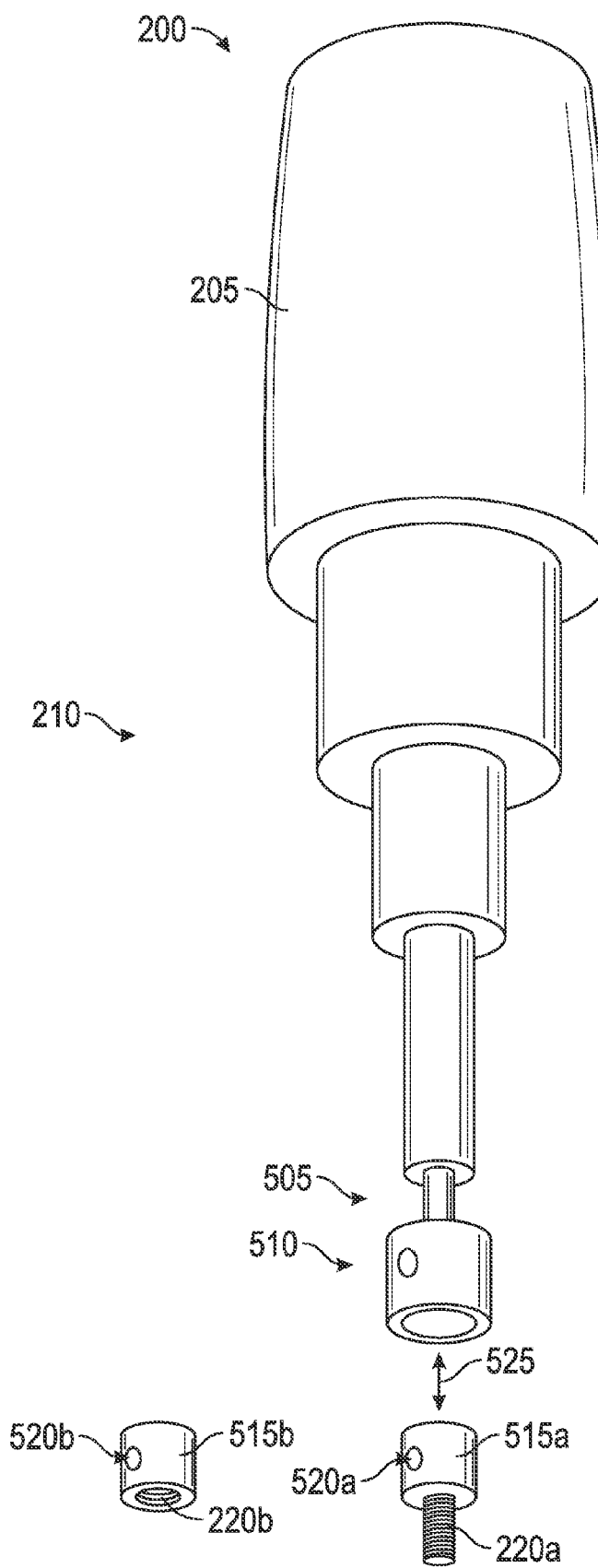
FIG. 5 depicts a side view of a channel nut tool in accordance with another embodiment.

FIG. 5 illustrates another example embodiment. Channel nut tool 200 can be configured to include an interchangeable fitting 515a (socket fitting) so that threaded shaft 220a can be matched to the size of the channel nut being installed. Channel nut tool 200 can be configured with an end piece 505 on the end of shank 210, which is configured to receive interchangeable fitting 515a and 515b, with a threaded shaft 220a or threaded port 220b, respectively.

In another embodiment, the threaded shaft or threaded port can be an English sized threaded shaft or port of sizes #8-32, #10-24, #10-32, ¼-20, 5/16-18, ⅜-16, 7/16-14, ½-13, ⅝-11, ¾-10, ⅞-9. The threaded shaft or port can also be a Metric sized threaded shaft or port of size M3.5, M4, M5, M6, M8, M10, M12. It should be appreciated that other English and Metric sized threaded shafts or ports may also be used and the disclosed sizes are merely provided as examples and not meant to limit the scope of the disclosure.

Arrow 525 indicates that interchangeable fitting 515a (or alternatively 515b) can be inserted into end piece (terminal for receiving a socket) 505. Interchangeable fitting 515a includes a locking mechanism 520a. Locking mechanism 520a keeps interchangeable fitting 220a locked into end piece 505 until lock release 510 is operated. This locking mechanism is provided because the installation or removal of the channel nut 300 requires that force be applied to hold the channel nut 300 in place in the framing system 400. Therefore, the locking mechanism 520a ensures that when this force is applied, interchangeable fitting 515 does not pull free of end piece 505 before the channel nut 300 is properly installed.

In a yet another embodiment, channel nut tool 200 could include a plurality of interchangeable fittings with varying English and Metric sized threaded shafts 220 so that the interchangeable fitting 515a can be selected to match the thread and size of the channel nut that is being installed.

Channel nut tool 200 can also include a plurality of interchangeable fittings to accept channel stud nuts. It should be appreciated that a channel stud nut is provided as an example of a channel nut with a stud, but other such channel nuts with studs can also be installed and the channel stud nut is referred to herein merely as an example and is not intended to limit the scope of the disclosed embodiments.

In this embodiment, interchangeable fitting 515b can be configured to receive a threaded member of a channel stud nut via threaded port 220b. As with interchangeable fitting 515a, interchangeable fitting 515b includes locking mechanism 520b and can include a plurality of interchangeable fittings with varying English and Metric sized threads in threaded port 220b so that the interchangeable fitting 515b can be selected to match the thread and size of the channel stud nut that is being installed.

Figure 6:
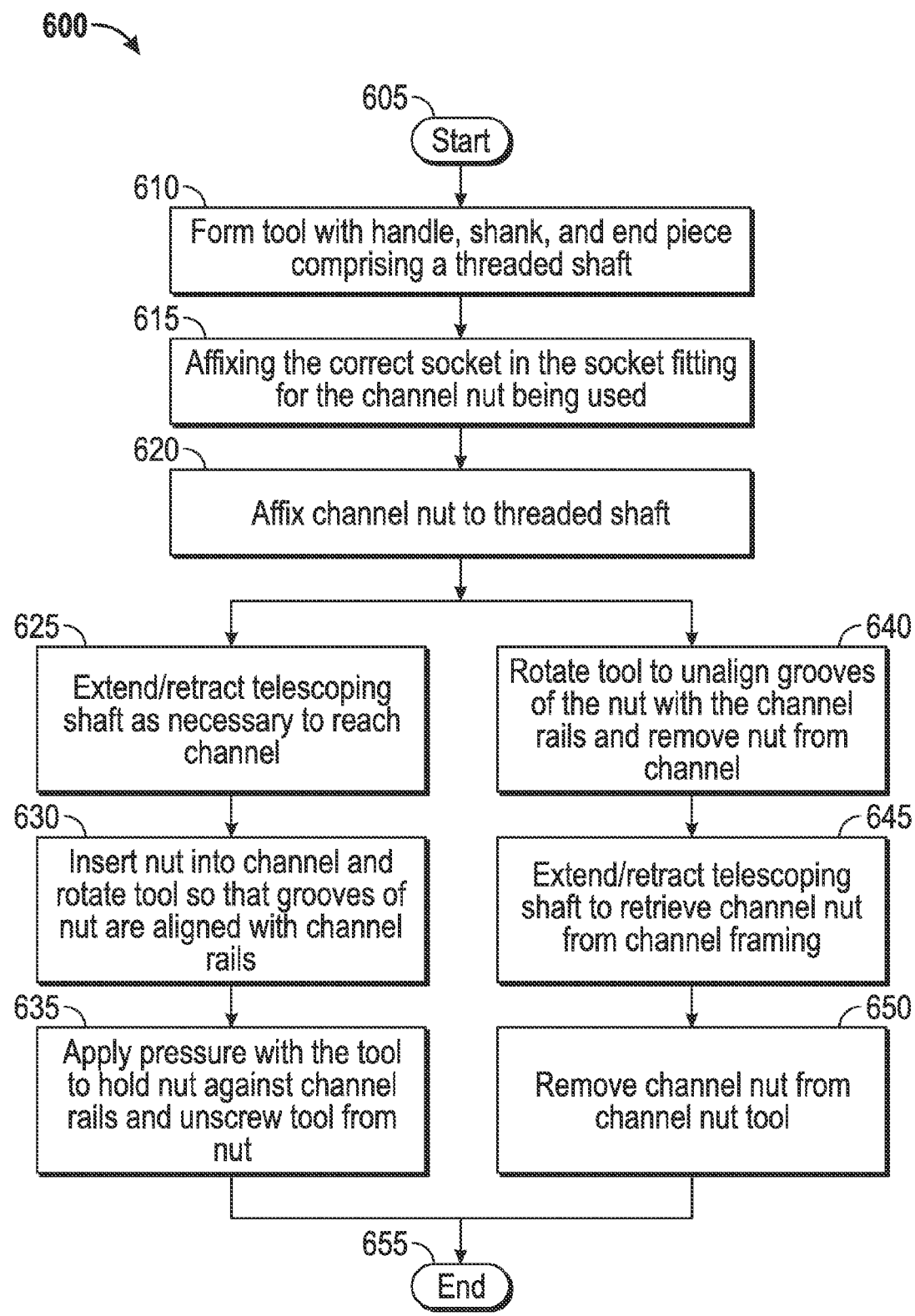
FIG. 6 depicts a series of steps for inserting a channel nut in a channel in accordance with yet another embodiment.

FIG. 6 illustrates a set of logical operational steps for installing removing a channel nut 600 in accordance with an additional embodiment. The method begins at block 605. The next step 610 is to form a tool with a handle, shank, and end piece comprising a threaded shaft. The shank can be a telescoping shank and the end piece can be configured to include a plurality of interchangeable fittings as shown in FIG. 5 above.

At block 615, the properly sized interchangeable fitting can be selected and engaged in the end piece according to the size and thread of the channel nut that is being installed or removed. The channel nut is then affixed to the threaded shaft of the end piece as shown at block 620.

To install the channel nut, the telescoping shaft is then extended as necessary to reach the channel framing system as illustrated by block 625. The nut is inserted into the channel and rotated so that the grooves in the channel nut are aligned with the channel rails shown at block 630. Next, as described by block 635, pressure is applied with the tool to hold the nut against the channel rails while the tool is unscrewed from the channel nut. The installation method ends at block 655.

In yet another embodiment, to remove the channel nut, the method proceeds from block 620 to block 640 where the tool is used to un-align the grooves of the nut from the channel rails so that the nut can be removed from the channel. Next, as illustrated at block 645, the telescoping shaft can be extended or retracted so that the channel nut can be retrieved from the channel framing system. The channel nut can then be unscrewed from the channel nut tool as described by block 650, and the removal method ends at block 655.

Based on the foregoing, it can be appreciated that a number of embodiments, preferred and alternative, are disclosed herein. For example, in one embodiment, a channel nut insertion and removal tool can comprise a shank, a handle formed on a first end of the shank, and an end piece comprising a threaded shaft configured to receive a nut formed on a second end of the shank. The threaded shaft can comprise 1 turn of thread.

In an alternative embodiment, the threaded shaft is configured to receive a channel nut. In an alternative embodiment, the second end of the shank comprises a terminal for receiving a socket and the threaded end piece comprises at least one socket fitting with a threaded shaft wherein the socket fitting is configured to engage the terminal for receiving a socket.

In an alternative embodiment, the second end of said shank comprises a terminal for receiving a socket and the threaded end piece comprises at least one socket fitting with a threaded port for receiving a threaded shaft of a stud nut wherein the socket fitting is configured to engage the terminal for receiving a socket.

In an additional alternative embodiment, the shank comprises at least one extendable telescoping member. The handle is formed from molded plastic and the shank is a metal shank.

In an alternative embodiment of the present invention, a system for inserting and removing channel nuts comprises a metal shank comprising at least one extendable telescoping member, a molded plastic handle formed on a first end of said shank, and an end piece comprising a threaded shaft configured to receive a nut formed on a second end of the shank. The threaded shaft comprises 1 turn of thread.

In an alternative embodiment the threaded shaft is configured to receive a channel nut.

In an alternative embodiment the second end of said shank comprises a terminal for receiving a socket and the threaded end piece comprises at least one socket fitting with a threaded shaft wherein the socket fitting is configured to engage the terminal for receiving a socket.

In an alternative embodiment, the second end of said shank comprises a terminal for receiving a socket; the threaded end piece comprises at least one socket fitting with a threaded port for receiving a threaded shaft of a stud nut wherein said socket fitting is configured to engage the terminal for receiving a socket.

In an additional embodiment, the shank comprises at least one extendable telescoping member.

In an alternative embodiment, a method for inserting a channel nut can be implemented, which includes steps or operations for forming a tool comprising a shank with a handle on a first end of the shank and an end piece comprising a threaded shaft configured to receive a nut on a second end of the shank, affixing a nut to the threaded shaft, inserting the nut into a channel structure and rotating the tool to align the nut with the channel, and twisting the tool to remove the nut from the threaded shaft thereby installing the nut in the channel. In an alternative embodiment, the threaded shaft can include 1 turn of thread.

In an alternative embodiment, the threaded shaft is configured to receive a channel nut. In an alternative embodiment, the method includes forming at least one terminal for receiving a socket on the second end of the shank and forming the threaded end piece as at least one socket fitting with a threaded shaft and engaging the at least one socket fitting in the terminal for receiving the socket to thereby allow the at least one socket filling to be interchanged.

In an alternative embodiment, the method comprises forming at least one terminal for receiving a socket on the second end of the shank and forming the threaded end piece as at least one socket fitting with a threaded port for receiving a threaded shaft of a stud nut and engaging the at least one socket fitting in the terminal for receiving the socket to thereby allow the at least one socket fitting to be interchanged.

In an alternative embodiment, the method comprises forming the shank of at least one extendable telescoping member and extending the shank to increase or decrease a reach of the shank. The method includes forming the handle of molded plastic and forming the shank of metal.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A system comprising:
   a channel nut comprising a threaded bore, at least two channel rails, and a flat top surface;
   a rail assembly; and
   a channel nut tool comprising:
   a metal shank having a first end and a second end;
   a molded plastic handle formed on said first end of said shank;
   an end piece formed on said second end of said shank comprising a socket fitting and a ball lock release aperture;
   a first socket comprising a threaded shaft connected to a socket body, and a ball lock; and
   a second socket comprising a threaded bore configured in a socket body, and a ball lock.

2. The system of claim 1 wherein said threaded shaft comprises no more than 1 turn of thread.

3. The system of claim 1 wherein said shank comprises at least one extendable telescoping member.

* * * * *